United States Patent
Hong et al.

(10) Patent No.: US 7,630,645 B2
(45) Date of Patent: Dec. 8, 2009

(54) DETECTING AN INFRARED TRANSCEIVER TYPE

(75) Inventors: William Hong, Austin, TX (US); Glenn Reinhardt, Austin, TX (US); Jeffrey Alderson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 457 days.

(21) Appl. No.: 11/273,703

(22) Filed: Nov. 14, 2005

(65) Prior Publication Data

US 2007/0110447 A1  May 17, 2007

(51) Int. Cl.
*H04B 10/00* (2006.01)
(52) U.S. Cl. .................. 398/107; 398/128; 398/135
(58) Field of Classification Search .......... 398/106, 398/107, 128, 135, 136, 138, 202
See application file for complete search history.

(56) References Cited

U.S. PATENT DOCUMENTS

| | | | | |
|---|---|---|---|---|
| 5,272,558 A | * | 12/1993 | Canestri et al. | 398/177 |
| 6,449,075 B1 | * | 9/2002 | Watson et al. | 398/121 |
| 2006/0089118 A1 | * | 4/2006 | Whitehouse | 455/352 |

* cited by examiner

*Primary Examiner*—Dalzid Singh (57) ABSTRACT

An infrared controller detects an infrared (IR) transceiver type by entering an IR transceiver detection mode and providing a command to another IR transceiver. The command is formatted in accordance with a first IR transceiver type. The IR controller determines whether a response to the command is received within a predetermined time period. When the response to the command is received within the predetermined time period, a first IR transceiver type is indicated. When the response to the command is not received within the predetermined time period, a second IR transceiver type is indicated.

17 Claims, 9 Drawing Sheets

DETECTING AN INFRARED TRANSCEIVER TYPE

BACKGROUND OF THE INVENTION

1. Technical Field of the Invention

This invention relates generally to infrared communication systems and more particularly to detecting types of infrared (IR) transceivers in such IR communications systems.

2. Description of Related Art

IR systems are known to include IR transceivers in communication via IR communication paths. Each IR transceiver includes a light generating diode and a light receiving diode. Such IR communication may conform to a standard or to a propriety protocol.

One IR standard is provided by the Infrared Data Association ("IrDA"). IrDA defines a specification titled "Serial Interface for Transceiver Control," published Mar. 29, 2000. This specification provides a standard command set for communications between an IR controller and an IR transceiver, and particular responses to the command set, depending on the device.

There are various types of infrared transceiver devices on the market, including some transceiver devices conforming to the IrDA serial interface specification, such as Vishay Semiconductor device TFDU8102. Some don't conform to the IrDA serial interface specification, such as "TEMIC style" devices. Examples of these non-conforming (or TEMIC style devices) include the TFDU6102 marketed by Vishay Semiconductors, the ZHX2010 device marketed by Zilog, and the GP2W1001YP device marketed by Sharp Electronics.

When designing circuitry for connecting an IR transceiver chip to an IR controller, the circuit designer was required to hard wire the IR controller with a transceiver device type (to select a transceiver communication protocol) by setting a pin on a chip. Alternatively, the circuit designer was required to manually program the IR controller chip to communicate with a specific IR transceiver type, for example, by writing to a flash memory or EEPROM to program the communication protocol for the particular transceiver type. These extra steps in the design and manufacturing process are clearly laborious and require a design change in IR device circuitry each time a different IR transceiver is selected to be used with the IR controller. Another issue is that once the transceiver is set, it cannot be changed without human interaction. As such, IR manufacturers typically include multiple products to cover the various protocols, which add to cost.

Therefore, a need exists for a method and apparatus of detecting an IR transceiver type without the above-referenced limitations.

BRIEF SUMMARY OF THE INVENTION

Generally, the present invention provides a method and apparatus that detects an infrared transceiver type. Such detection begins by entering an IR transceiver detection mode, then providing a command which is formatted in accordance with a first IR transceiver type to an IR transceiver. The detection continues by determining whether a response to the command is received within a predetermined time period. If the response to the command is received within the predetermined time period, a first IR transceiver type is indicated. If the response to the command is not received within the predetermined time period, a second IR transceiver type is indicated.

DETAILED DESCRIPTION OF THE INVENTION

Figure 1:
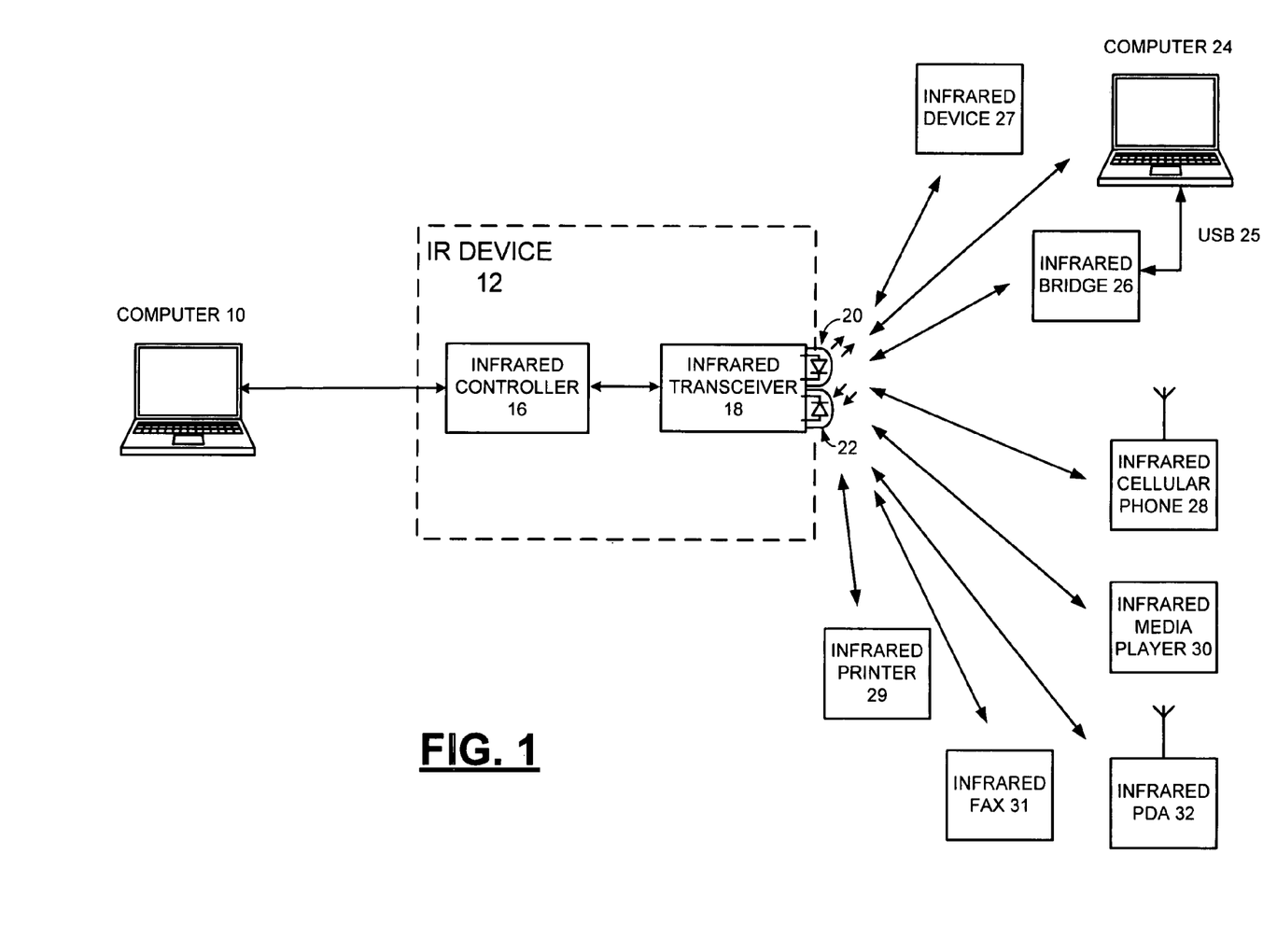
FIG. 1 illustrates a schematic block diagram of a computer and IR device in accordance with the present invention.

FIG. 1 illustrates a schematic block diagram of a computer 10 operably coupled to IR device 12. IR device 12 operably couples computer 10 via an IR communication path to a computer 24, to an IR bridge 26, to an IR device 27, to an IR cellular phone 28, to an IR fax machine, to a IR printer 29, to an IR media device 30, and/or to an IR personal digital assistant (PDA). IR bridge may have circuitry similar to IR device 12, for providing computer 24 with an IR communication conduit. IR bridge 26 may be operably coupled to computer 24 via a USB port. IR device 27 may be any device having an IR communication capability. As one of ordinary skill in the art would appreciate, the computers 10 and 24 include more circuitry than shown in FIG. 1, however, such additional circuitry is not germane to the present invention thus, for the sake of clarity, the additional circuitry has been omitted. Also, as would be apparent to one of ordinary skill in the art, IR device 12 may be coupled to devices other than computer 10, such as a media player, cellular phone, printer, scanner, PDA, etc., for the purpose of providing an IR communications path to another device such as a computing device, a communications device and/or a peripheral device.

IR device 12 may be operably coupled to computer 10 over a data bus (e.g., via a Universal Serial Bus (USB) data port). IR device 12 may be an internal component of computer 10 or it may be a self-contained external peripheral component. The IR device 12 includes an IR controller 16, and an IR transceiver 18.

The IR controller 16 acts as a data bridge between host CPU 14 and IR transceiver 18. IR controller 16 may perform modulation and demodulation, encoding/decoding, CRC generation/checking, bit and character stuffing, preamble, start and stop bit generation, framing, synchronization for higher data rates, and/or data buffering. The IR controller 16 may support one or more of the IrDA data transfer protocols, for example, slow IR (SIR), medium IR (MIR), fast IR (FIR), and very fast IR (VFIR). IR controller 16 may also support a proprietary data transfer protocol with the same (pulse position modulation) or other modulation schemes such as amplitude shift keying, pulse code modulation, etc.

IR transceiver 18 includes a light transmitting diode 20 and a light receiving diode 22. IR transceiver 18 may be of different types. For example, IR transceiver 18 may be of a first type that has the characteristic of being compatible with the IrDA serial interface for transceiver control specification ("serial interface"). The IrDA physical layer specifications and IrDA serial interface for transceiver control are herein incorporated by reference, and may be found at www.irda.org.

The serial interface specification provides a command-based communication standard and allows for communication between IR controller 16 and IR transceiver 18 by way of serial programming sequences in accordance with the serial interface specification. Such a transceiver 18, is provided for example, by a Vishay Semiconductors TFDU8108, which is a VFIR device, which is compatible with the serial interface specification.

Alternatively, the transceiver may be of a second transceiver type that does not employ the IrDA serial interface specification. Examples of TEMIC style interface devices are the TFDU6102 device marketed by Vishay Semiconductors, the ZHX2010 device marketed by Zilog, and the GP2W1001YP device marketed by Sharp Electronics.

In operation, the host CPU 14 provides data to the IR controller 16. The IR controller 16 may then generate IR formatted data from the incoming data by performing modulation, encoding, CRC generation, bit and character stuffing, preamble, start and stop bit generation, framing, synchronization for higher data rates, and/or data buffering in accordance with an IrDA data transfer protocol (e.g., SIR) or a proprietary protocol. The IR formatted data is then transmitted from the IR controller 16 to the IR transceiver 18, which converts the IR formatted data, which is a digital format, into pulses that are transmitted utilizing a light transmitting diode 20.

The infrared pulses that are formatted in accordance with an IrDA protocol or a proprietary protocol are then received by a light receiving diode on a device that is capable of receiving the IR pulses. E.g., IR bridge 26, an IR cellular phone 28, IR media device 30, and IR personal digital assistant (PDA) 32. These devices may maintain two-way communications with computer 10 via IR device 12 by transmitting infrared pulses that are received by light receiving diode 22. The IR transceiver 22 then converts the received light pulses to electrical pulses and transmits them to the IR controller 16. IR controller 16, in accordance with an IrDA data transfer protocol (or a proprietary protocol), may then perform demodulation, decoding, CRC checking, bit and character stripping, start and stop bit stripping, frame stripping, synchronization for higher data rates, and/or data buffering. The data is then passed to host CPU 14 in computer 10.

Figure 2:
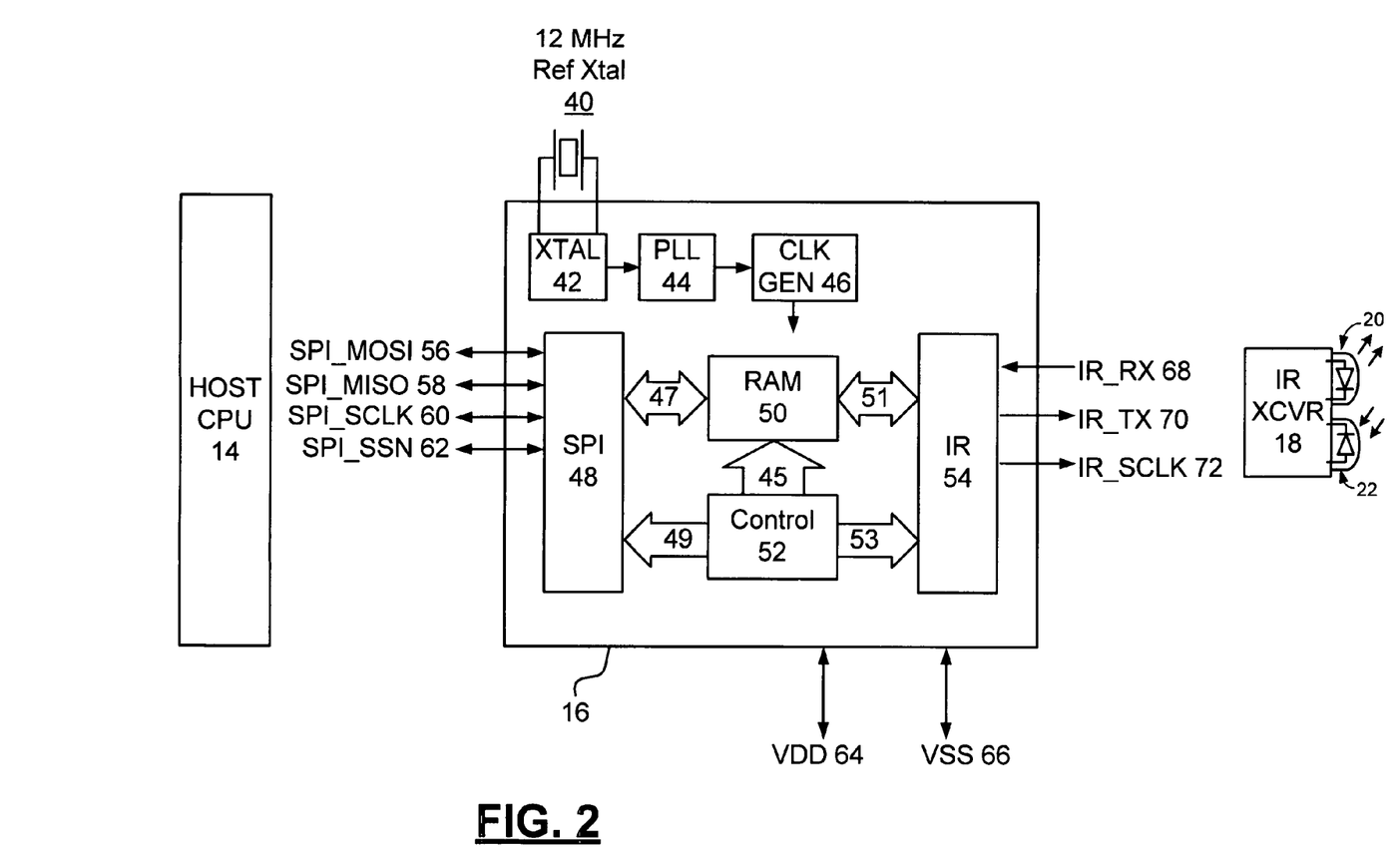
FIG. 2 illustrates a schematic block diagram of an IR controller in accordance with the present invention.

FIG. 2 illustrates a schematic block diagram of IR controller 16 in accordance with the present invention. The IR module 54 of IR controller 16 is operably coupled to IR transceiver 18 by clock IR_SCLK 72, transmit IR_TX 70, and receive IR_RX 68 lines. Host CPU 14 of computer 10 is operably coupled to the serial peripheral interface (SPI) block 48 of IR controller 16 over SPI_MOSI 56, SPI MISO 58, and SPI_SCLK 60 lines. IR controller 16 receives power via VDD 64 and VSS 66 lines. External crystal 40, crystal interface circuitry 42, phase locked loop (PLL) 44, and clock generator circuitry (CLK GEN) 46 may be coupled as shown in FIG. 2 to provide one or more system clocks.

SPI 48 provides a bidirectional data bus with separate serial input and output lines: SPI_MOSI 56 is the serial data in line; SPI_MISO 58 is the serial data out line; SPI_SCLK 60 is the serial clock in line; and SPI_SSN 62 is the slave select line. The clock signal on SPI_SCLK 60 may be driven by computer 10.

IR controller 16 is configured as a SPI slave to the host CPU 14 by asserting a slave signal on the SPI_SS 62 line (e.g., active low signal). Data may be received from host CPU 14 to SPI 48 by driving the SPI_SCLK 60 and SPI_MOSI 56 signals. For receiving data, the IR controller 16 will capture the incoming SPI_MOSI 58 using the positive edge of SPI_SCLK 60. For sending data, the current bit is driven out on SPI_MISO 58 and changed on the falling edge of SPI_SCLK 60.

External crystal 42, PLL 44, and CLK GEN 46 function to produce one or more system clocks for the IR controller 16. To achieve this, the XTAL 42 produces a reference clock from an external crystal 40. The PLL 44 converts the reference clock into a desired clock by multiplying the clock signal to 240 MHz, then sending the PLL output clock to the clock generator 46, where the clock signals are divided to provide one or more system clocks needed by the different blocks, in accordance with their clock speed requirements.

The IR controller 16 may support one or more of the IrDA data transfer protocols, for example, slow IR (SIR), medium IR (MIR), fast IR (FIR), and very fast IR (VFIR). IR controller 16 may also support a proprietary protocol. IR controller 16 may provide SPI 48 as a fast synchronous bit serial interface to host CPU 14. SPI 48 may support a sustained transfer rate of greater than 16 Mb/sec to meet the requirements of the VFIR transfer rates.

In order to sustain required transfer rates for the aforementioned transmission protocols, the IR controller 16 has memory 50. Memory 50 may provide a set of memory buffers for intermediate storage of data frames. Memory 50 may provide four receive buffers and two transmit buffers. The control logic 52 keeps track of the buffer status and controls data flow between memory 50, SPI 48, and the IR module 54. Additionally, IR controller 16 is software configurable through a set of registers which are accessible using the SPI host interface 48.

The control logic 52 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 50 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the control logic 52 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory 50 stores, and the control logic 52 executes, operational instructions corresponding to at least some of the steps and/or functions illustrated in FIGS. 1 to 11.

The IR module 54 manages the low level framing involved with IrDA physical layer communications. IR module 54 may optionally communicate with IR transceiver 18 using an IrDA serial interface for transceiver control specification. In accordance with the present invention, IR 54 is capable of detecting an IrDA serial interface transceiver device and configuring IR controller 16 to use an IrDA serial interface specification depending on whether an IrDA serial interface device is detected. The serial interface specification is a command-based communication standard and allows for the communication between IR controller 16 and IR transceiver 18 by way of serial programming sequences on the clock IR_SCLK 72, transmit IR_TX 70, and receive IR_RX 68 lines.

Figure 3:
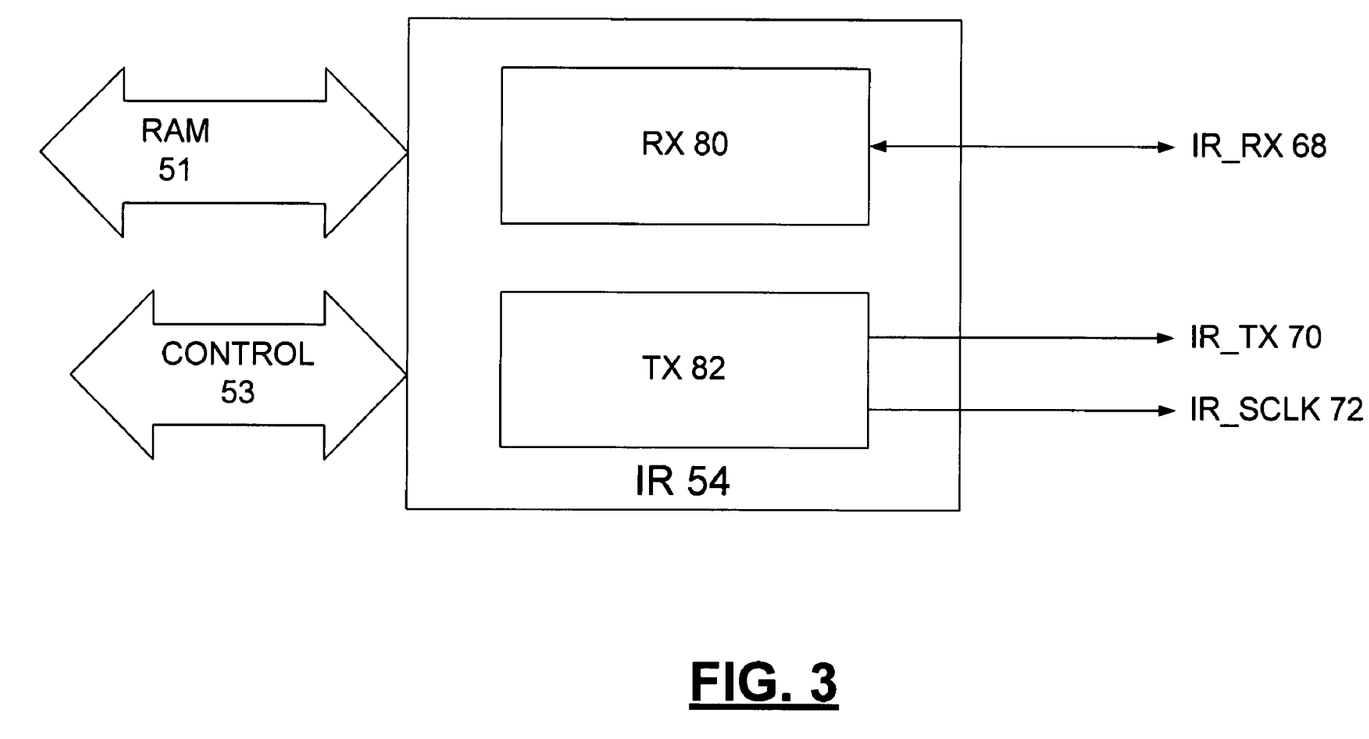
FIG. 3 illustrates a schematic block diagram of an IR module in accordance with the present invention.

FIG. 3 illustrates a schematic block diagram of an embodiment of an IR module 54 in accordance with the present invention. IR module 54 includes an IR receive module 80 and an IR transmit module 82. IR receive module 80 includes circuitry to receive electrical pulses from IR transceiver 18 over IR_RX 68. IR transmit module 82 includes circuitry to transmit electrical pulses to IR transceiver 18 over IR_TX 70. Memory line 51 operably couples the IR module 54 to memory 50 and control line 53 operably couples IR module 54 to the control block 52.

In operation, the IR module 54 encodes data from the host CPU 14 and sends it out over IR_TX 70 to the IR transceiver 18. The incoming IR_RX 68 is sampled and decoded, then transferred to the host CPU 14. Data to/from the host may be processed one or more bytes (8 bits) at a time. IR controller 16 may implement an IrDA Physical Layer Specification, such as version 1.4. IR controller 16 supports the following IrDA data rates: SIR: 2400 bps, 9600 bps, 19.2 kbps, 38.4 kbps, 57.6 kbps and 115.2 kbps; MIR: 576 kbps and 1.152 Mbps; FIR: 4Mbps; and VFIR: 16 Mbps. IR controller 16 may also support a proprietary protocol.

Figure 4:
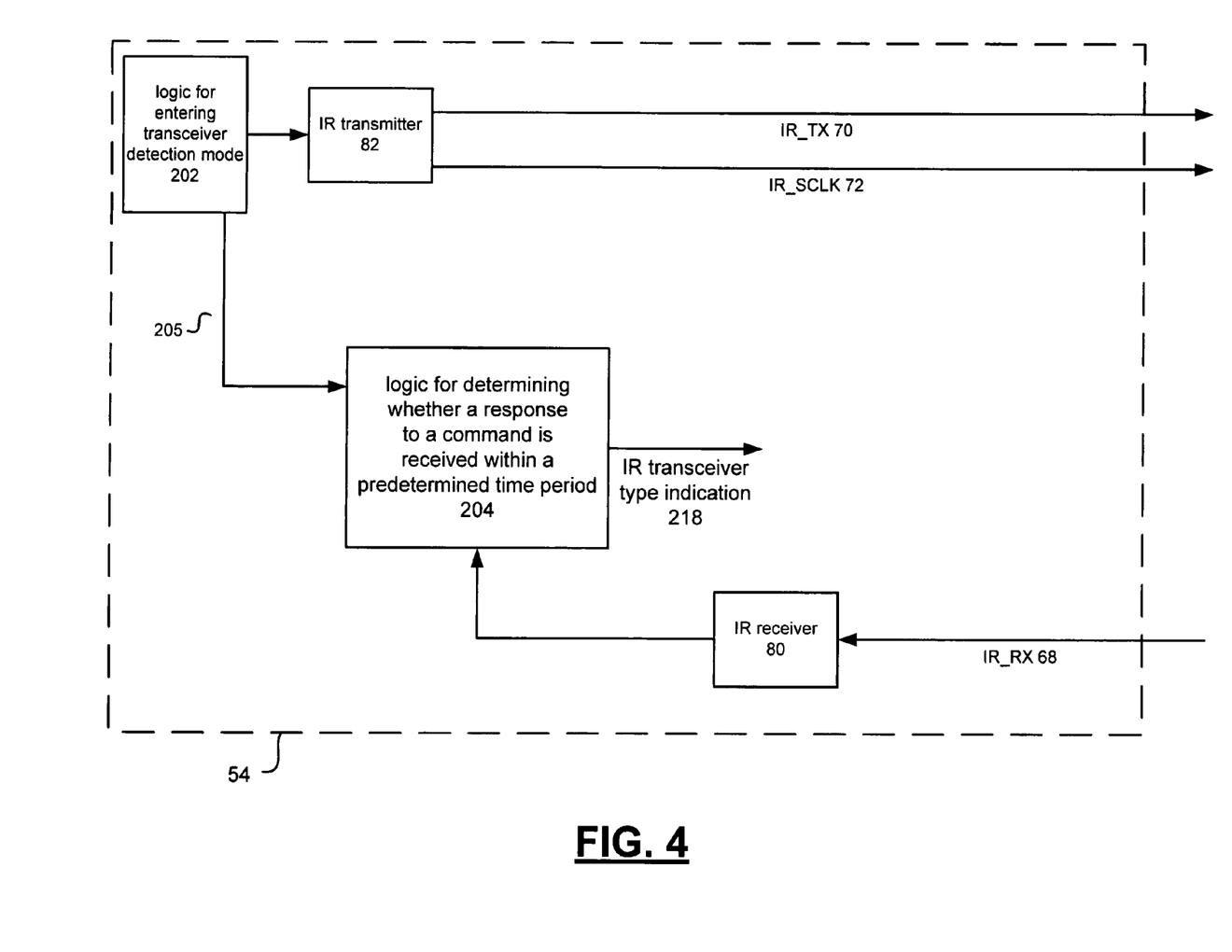
FIG. 4 illustrates a schematic block diagram of an embodiment of the IR module in accordance with the present invention.

FIG. 4 illustrates a schematic block diagram of an embodiment of the IR module 54 in accordance with the present invention. As may be seen from FIG. 4, IR module 54 includes a first logic for entering an IR transceiver detection mode 202 ("first logic" 202), an IR transmitter 82 for providing a command to an IR transceiver formatted in accordance with a first IR transceiver type, an IR receiver 80 for receiving a response to the command from the IR transceiver, and logic for determining whether a response to the command is received within a predetermined time period 204 ("second logic" 204). IR transceiver 82 connects to IR transceiver 18 via lines IR_TX 70 and IR_SCLK 72. IR receiver 80 connects to IR transceiver 18 via line IR_RX 68.

In operation, to detect an IR transceiver type, first logic 202 sends a signal to IR transceiver 82 and a signal to second logic 204. The signal from first logic 202 to IR transmitter 82 causes IR transmitter 82 to provide a command formatted in accordance with a first transceiver type (e.g., compatible with the IrDA serial interface for transceiver control) over IR_TX 70 line to IR transceiver 18. Such a command is expected to provoke a response within a predetermined time period from a first transceiver type if that transceiver type is connected. Accordingly, if IR receiver 80 receives such a response, it provides a signal to second logic 204.

Second logic 204 determines whether the response to the command was received within a predetermined time period, e.g., up to four clock cycles, from sending the command. When the response to the command is received within the predetermined time period, second logic 204 provides an indication on line 218 that the first IR transceiver type is present. However, when the response to the command is not received within the predetermined time period, second logic 204 provides an indication on line 218 that a second IR transceiver type is present.

The IR controller 16 may optionally transmit additional commands to identify a transceiver type. For example, if a proper response is not timely received by a first transceiver type, then IR controller 16 may send a second "send type" command. If a proper response is not timely received to the second command, then a third "send type" command may be sent. This may continue until a list of "send type" commands is exhausted. For instance, as described in more detail later, there are a plurality of commands defined in the IrDA standard that may be sent to the IR transceiver 18, yet some transceiver devices may not be capable of responding to certain commands. Accordingly, transmitting more than one command may be desirable before making a positive determination of the transceiver type.

Figure 5:
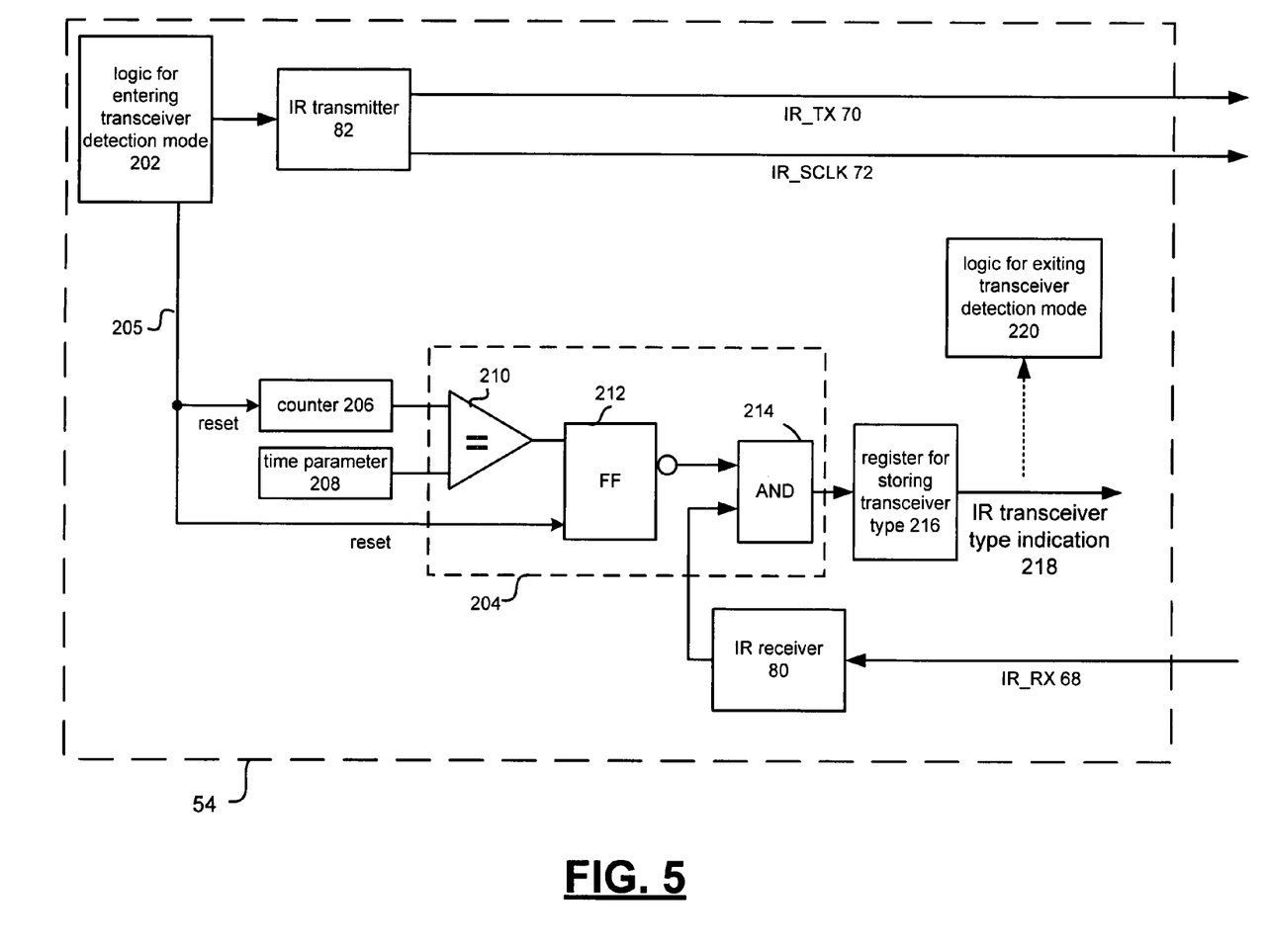
FIG. 5 illustrates a schematic block diagram of another embodiment of an IR module in accordance with the present invention.

FIG. 5 illustrates a schematic block diagram of another embodiment of IR module 54 in accordance with the present invention. IR module 54 includes a first logic for entering an IR transceiver detection mode 202 ("first logic" 202), an IR transmitter 82 for providing a command to an IR transceiver, an IR receiver 80 for receiving a response to the command from the IR transceiver, a counter 206, a time parameter store 208 for storing a predetermined time period, and a register for storing a first or second IR transceiver type 216. IR module 54 also includes second logic for determining whether a response to the command is received within a predetermined time period 204 ("second logic" 204). The second logic 204 includes comparator 210, flip flop 212, and AND gate 214. Time parameter store 208 stores a predetermined time period parameter. The recited elements may be coupled as shown in FIG. 5.

In operation, to detect an IR transceiver type, first logic 202 sends a signal to IR transceiver 82 and a reset signal on line 205 to reset the counter 206 and flip flop 212. The signal instructs IR transmitter 82 to provide a command formatted in accordance with a first transceiver type (e.g., compatible with the IrDA serial interface for transceiver control) over IR_TX 70 line to IR transceiver 18.

On each clock cycle of clock line IR_SCLK 72, counter 206 increments the count. Comparator 210 receives the count from counter 206 and receives the predetermined time period parameter from time parameter store 208. On each clock cycle, comparator 210 compares the two inputs. For example, in accordance with the present invention, the predetermined time period parameter may be set to four clock cycles. When the counter reaches a count matching the predetermined time period parameter (e.g., four), comparator 210 provides a signal, triggering flip flop 212. Accordingly, before four clock cycles are completed the output of flip flop 212 is high. After the predetermined time period of four clock cycles, the output of flip flop 212 is low. If IR receiver 80 receives a response to the command, a high signal will appear as an input to AND gate 214. If a response to the command is received within the predetermined time period, AND gate 214 will output a high signal, which indicates that a first IR transceiver type is present.

If the response to the command is not received within the predetermined time period, a second IR transceiver type is indicated. This indication may be stored in a register for storing the first or second IR transceiver type 216. The register 216 may provide an IR transceiver type indication 218 so that the appropriate signaling may be used. Finally, logic for exiting transceiver detection mode 220 returns IR module 54 to other operations.

Figure 6:
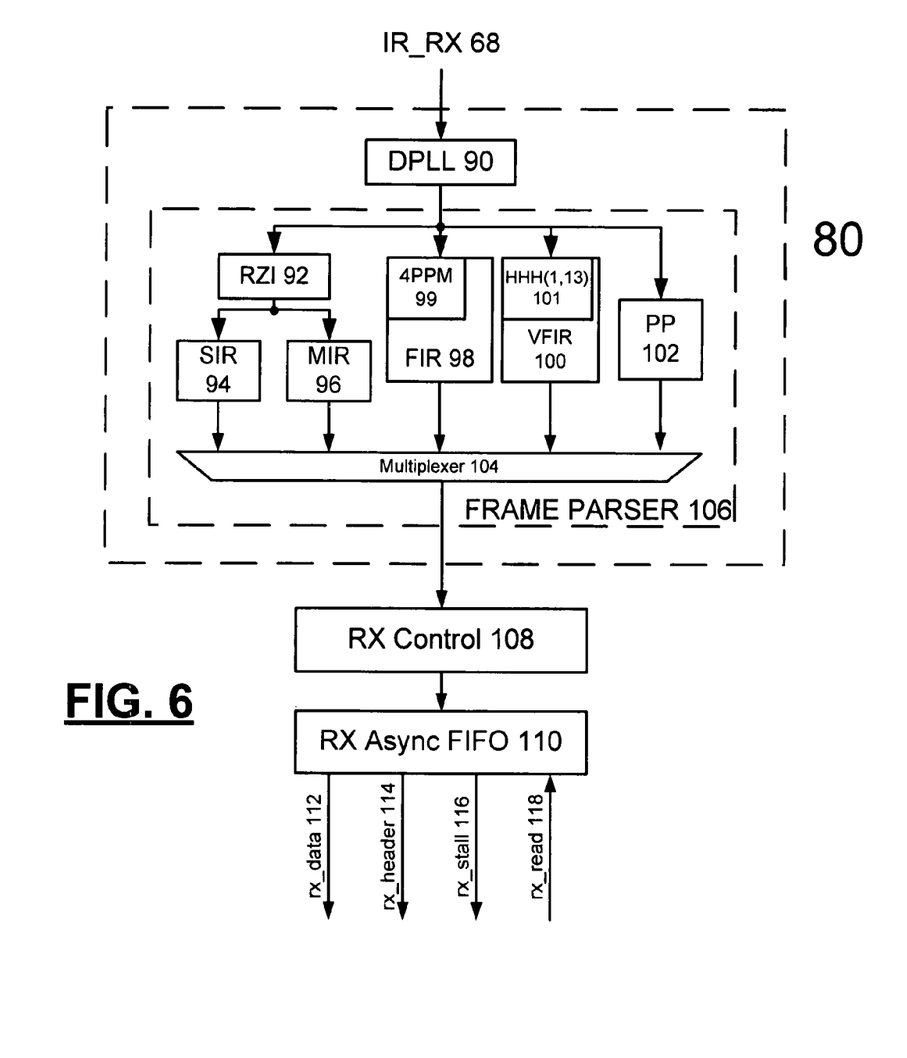
FIG. 6 illustrates a schematic block diagram of an IR receive module in accordance with the present invention.

FIG. 6 illustrates a schematic block diagram of an embodiment of an IR receive module 80 in accordance with the present invention. IR receive module 80 includes RX async FIFO 110 operatively coupled to RX control 108, which is operatively coupled to frame parser 106, which is operatively coupled to digital phase locked loop (DPLL) 90. DPLL 90 has a line IR_RX 68 for receiving an electrical asynchronous signal.

RX Control 108 includes circuitry to control the IR receive module 80. RX Async FIFO 110 has several input and output lines including rx_data 112, rx_header 114, rx_stall 116, and rx_read 118. Writing to RX async FIFO 110 will place the data in preparation of being transmitted to the host. rx_data 112 provides an output 8-bit byte of received data. rx_header 114 provides a 1-bit output signal indicating rx_data is frame header information. rx_stall 116 provides a 1-bit output signal that the IR receive module 80 currently has no data available. Rx_read 118 provides a 1-bit input signal to read the next byte of data from the IR receive module 82. Whenever the IR receive module 80 is not driving rx_stall 116, it means there is data available in the RX async FIFO 110. The RX control 108 is responsible for reading data from the RX async FIFO 110 and placing it into a currently available RX buffer.

The frame parser 106 processes SIR, MIR, FIR and VFIR frame modes and speeds, in accordance with the IrDA physical layer and framing specifications. Frame parser 106 also processes a proprietary protocol, which although is in accordance with the IrDA physical layer, may not necessarily be in accordance with IrDA frame modes and framing specifications.

SIR RX block 94 is capable of processing IrDA frames at 2400 bps, 9600 bps, 19.2 kbps, 38.4 kbps, 57.6 kbps and 115.2 kbps. In accordance with the IrDA physical layer specification, SIR RX block 94 may strip a number of extra BOFs in the frame header, escapes appropriate bytes in a frame and check a CRC and a remove EOF bit(s).

MIR RX block 96 is capable of processing IrDA frames at 576 kbps and 1.152 Mbps. In accordance with the IrDA physical layer specification, MIR RX block 96 may strip start and stop flags, and check a CRC.

FIR RX block 98 is capable of processing IrDA frames at 4 Mbps. In accordance with the IrDA physical layer specification, FIR RX block 98 may strip a preamble, start and stop flags and check a CRC. FIR RX block 98 may also decode the data in 4 PPM format via 4 PPM block 99.

VFIR RX block 100 is capable of processing IrDA frames at 16 Mbps. In accordance with the IrDA physical layer specification, the VFIR TX block 100 may strip a preamble, start and stop flags, check a CRC, strip a Flush Byte and a NULL sequence into a transmitted frame. It may also decode scrambling on the frame data. VFIR RX block 100 may decode the data in HHH(1, 13) format via HHH(1, 13) block 137.

PP RX block 102 is capable of processing non-IrDA frame structures. RX control 108 can selectively enable or disable most operations that are performed on frames. Accordingly, RX control 108 may enable and disable PP RX block 102 operations for checking CRC, stripping framing data, decoding, and so on. One possible application of this, for example, is receiving SIR raw data that complies with the IrDA physical layer specification, but doesn't support the IrDA frame structures.

In operation, an incoming IR signal is converted by the light receiving diode 22 on the external IR transceiver 18 into an electrical asynchronous signal, input on the line IR_RX 68. The asynchronous signal is then synchronized to a clock domain. For signaling rates of 4 Mbps and higher, a DPLL 90 may retrieve the data out of the asynchronous stream on IR_RX 68. The DPLL 90 may use not only a single edge to set the phase, but uses the timing information of all signal edges, resulting in a sampling clock with much less jitter. A rapid phase lock is mandatory because it determines the length of the preamble (or training sequence), sent at the start of every packet to allow phase lock.

After synchronization, the demodulation is achieved by one of the blocks (RZI 92, 4 PPM 99, or HHH [1, 13] 101), according to signaling rate. Note that a 4 Mbps IrDA device can communicate with an older 115.2 kbps device as well, because the IrDA standard defines the first contact between new devices is always 9,600 bps (mandatory signaling rate). Higher protocol layers also ensure that a maximum signaling rate is arranged no higher than the maximum of the slower device.

After demodulation, the data is decoded and checked for CRC correctness. Any difficulties that might arise are asserted by an interrupt request signal rx_stall 116 (unless masked) to the RX control block 52. RX control block 108 then writes to RX async FIFO 110, buffering the transmission to the host CPU 14.

Figure 7:
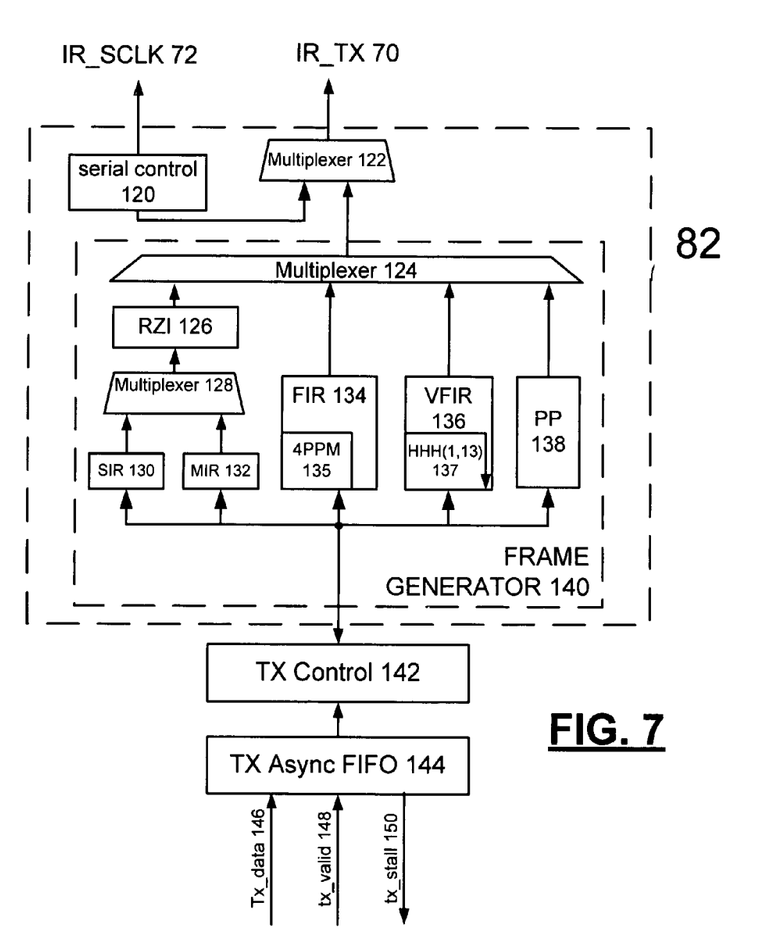
FIG. 7 illustrates a schematic block diagram of an IR transmit module in accordance with the present invention.

FIG. 7 illustrates a schematic block diagram of an embodiment of an IR transmit module 82 in accordance with the present invention. IR transmit module 82 includes TX async FIFO 144, TX control 142, frame generator 140, serial control 120, and multiplexer 122 that are operably coupled as shown in FIG. 6. TX Control 142 includes circuitry to control the IR transmit module 82.

TX Async FIFO 144 includes two input lines Tx_data 146 and Tx_valid 148, and an output line Tx_stall 150. TX Async FIFO 144 provides a buffer for data to be processed by frame generator 140. Tx_data 146 provides TX Async FIFO 144 with an input for 8-bit bytes of transmit data. Writing data to this location places the data in the TX asynch FIFO 144, buffered for transmission. Tx_valid 148 provides a 1 bit input to IR transmit module 82 indicating that tx_data 146 is valid. Tx_stall 150 provides a 1-bit output to indicate IR transmit module 82 cannot accept any data while asserted.

The frame generator 140 processes SIR, MIR, FIR and VFIR frame modes and speeds, in accordance with the IrDA physical layer and framing specifications. Frame generator 140 also processes a proprietary protocol, which although is in accordance with the IrDA physical layer, may not necessarily be in accordance with IrDA frame modes and framing specifications.

SIR TX block 130 is capable of processing IrDA frames at 2400 bps, 9600 bps, 19.2 kbps, 38.4 kbps, 57.6 kbps and 115.2 kbps. In accordance with the IrDA physical layer specification, SIR TX block 130 inserts a number of extra beginning of frame bits (BOFs) specified in the frame header, escapes appropriate bytes in a frame and inserts a CRC and a EOF.

MIR TX block 132 is capable of processing IrDA frames at 576 kbps and 1.152 Mbps. In accordance with the IrDA physical layer specification, MIR encoder 132 may insert start and stop flags, a CRC, and escapes appropriate bits in a frame. The outputs from SIR TX block 130 and MIR TX block 132 are coupled to return-to-zero-inverted (RZI) modulation block 126 via multiplexer 128.

FIR TX block 134 is capable of processing IrDA frames at 4 Mbps. In accordance with the IrDA physical layer specification, FIR TX block 134 may insert a preamble, start and stop flags and a CRC. FIR TX block 134 may also encode the data in 4 PPM format via 4 PPM block 135.

VFIR TX block 136 is capable of processing IrDA frames at 16 Mbps. In accordance with the IrDA physical layer specification, the VFIR TX block 136 may insert a preamble, start and stop flags, a CRC, a Flush Byte and a NULL sequence into a transmitted frame. It may also perform scrambling on the frame data. VFIR TX block 136 may encode the data in HHH(1, 13) format via HHH(1, 13) block 137.

PP TX block 138 is capable of processing non-IrDA frame structures. TX control 142 can selectively enable or disable most operations that are performed on frames. Accordingly, TX control 142 may enable and disable PP TX block 138 operations for generating CRC, framing data, encoding, and so on. One possible application of this, for example, is transmitting SIR raw data that complies with the IrDA physical layer specification, but doesn't support the IrDA frame structures.

The outputs from RZI block 126, FIR TX block 134, VFIR TX block 136 and PP TX block 138 are inputs to multiplexer 124, which is operatively coupled to multiplexer 122. Serial control 120 provides a clock signal IR_SCLK 72. The bits from multiplexer 122 are driven out on IR_TX 70 and the data is clocked using IR_SCLK 72.

Figure 8:
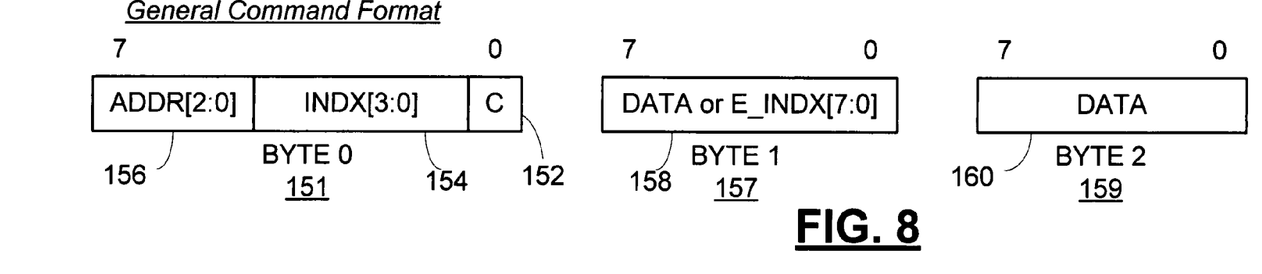
FIG. 8 illustrates a graphical representation of general command formats in accordance with the present invention.

FIG. 8 illustrates a graphical representation of general command formats in accordance with the present invention. In accordance with the IrDA serial interface for transceiver control specification, a set of commands is provided to handle the various transactions between the IR controller 16 and the IR transceiver 18. The IR controller 16 is the master, and initiates commands. The IR transceiver 18 is the slave and responds to commands/read requests.

The command format consists of a command phase BYTE_0 151, an optional extended command phase BYTE_1 157, and an optional response phase BYTE_2 159. Data is transferred in little endian order. Accordingly, bit 0 of BYTE_0 151 is the first bit transferred; bit 7 of BYTE_2 159 is the last.

The first byte, BYTE_0 151 contains the address of the slave (ADDR field 156) to be accessed and two control fields. The first control field is the INDX field 154. The INDX field 154 points to a particular register to write to (or read from, in the case of a read transaction). It determines whether the transaction is a special transaction or a data transaction. The second control field is the C field 152, which consists of one bit and either determines the data transfer direction (e.g., specifies a read (0) or write (1) command) or it further qualifies a special transaction.

The second byte, BYTE_1 157, is present in read and write transactions. It contains either the data 158 being transferred between master and slave, or the 'extended' register index.

The third byte, BYTE_2 159 contains the data 160 to be written into the slave to select the operational mode in a write transaction, and the returned data when in a read transaction. A slave ignores invalid commands as well as commands specifying a register that is not implemented. A slave may respond to one or more addresses. The response from the IR transceiver 18 is carried in BYTE_2 159, and is the last byte of the transaction.

Figure 9:
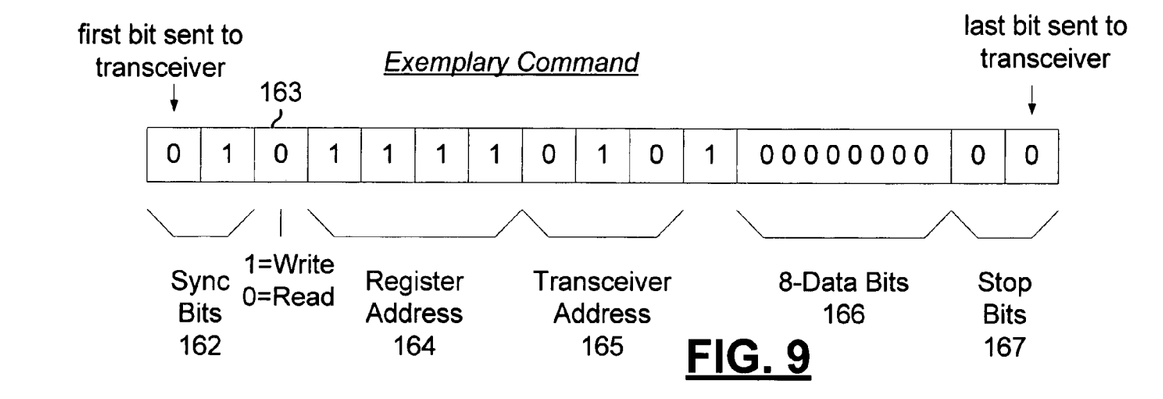
FIG. 9 illustrates a graphical representation of an exemplary command in accordance with the present invention.

FIG. 9 illustrates a graphical representation of an exemplary command in accordance with the present invention. The slave, IR transceiver 18 may include extended indexed registers that are addressable through various commands if the transceiver is compatible with the IrDA serial interface specification. In accordance with the specification, the slave transceiver device may then respond with data. Examples of such commands may be found in the IrDA serial interface specification. For purposes of illustration, an exemplary command is described below.

The first bits to be sent to the transceiver are sync bits 162, '01'. These bits precede the beginning of a command to a transceiver for synchronization purposes. Then read/write indicator field 163 indicates a '0' for a read transaction and a '1' for a write transaction. In this exemplary command, read/write indicator field 163 indicates that this is a read transaction because it is set to '0'. The register address 164 in this exemplary command is the extended index code, which is '1111'. The transceiver address 165 in this exemplary command is set to '010', to address a particular device. Next, an 8-data bit extended index word 166 of '00000000' is sent. This exemplary index word is used to request a value from the register identifying a transceiver manufacturer. It should be appreciated by one of ordinary skill in the art, that many other transceiver addresses and registers may be addressed to receive a response from IR transceiver 18. For example, an 8-data bit extended index word 166 of '00000001' may be transmitted to transceiver 18 to request a value from the register identifying a device ID. Finally, stop bits 167 '00' are sent to indicate the end of the command.

Figure 10:
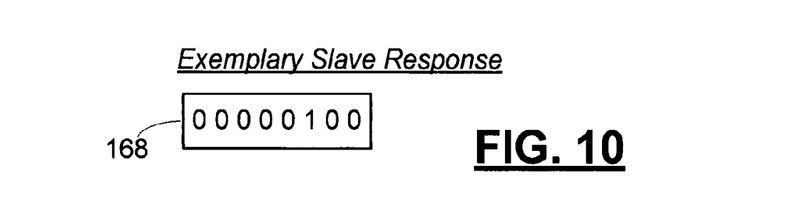
FIG. 10 illustrates a graphical representation of an exemplary slave response format in accordance with the present invention.

FIG. 10 illustrates a graphical representation of an exemplary slave response format in accordance with the present invention. In response to the exemplary command provided in FIG. 9, which requested a manufacturer ID code, the IR transceiver 18 will, if it is compatible with an IrDA serial interface, return a value identifying the transceiver manufacturer. For example, if the device is a Vishay device, the returned value will be 04 (hex), as shown by the exemplary slave response 168.

In accordance with the present invention, if the IR controller 16 receives an identifiable response conforming to the IrDA serial interface specification, within a predetermined time from the command being transmitted to the transceiver 18, then an indication may be set that the transceiver type conforms to the IrDA serial interface specification. In accordance with the present invention, the predetermined time is within substantially 4 clock cycles after the last bit of the command phase, taking into account transmission delays. If a response is not received within the predetermined time, then an indication may be set that the transceiver type is a non-IrDA device, such as a TEMIC style device.

Figure 11:
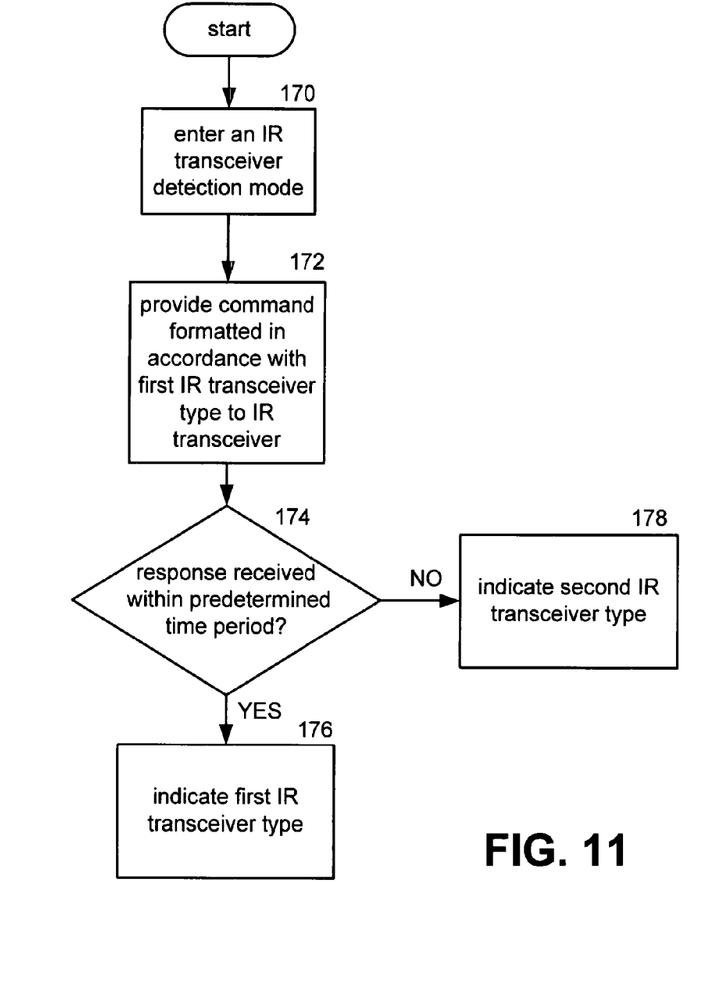
FIG. 11 illustrates a logic diagram of a method for detecting an IR transceiver type.

FIG. 11 illustrates a logic diagram of a method for detecting an IR transceiver type. The process begins at step 170 where an IR transceiver detection mode is entered. The process then proceeds to step 172, where a command formatted in accordance with a first IR transceiver type is provided to the IR transceiver. As previously described, the first IR transceiver type preferably includes the IrDA serial interface for transceiver control. Optionally, the command that is formatted in accordance with the first IR transceiver type may comprise a request to access one of a plurality of registers of the first IR transceiver type. Optionally, the request may comprise one of a read request and a write request. Also optionally, the request may comprise one of a status check, a function execution, a transceiver ID detection, a capability detection, a serial interface initialization signal, and a bootup initialization sequence.

The process then proceeds to step 174, where there is a determination of whether a response is received within a predetermined time period. Optionally, a receive path from the IR transceiver for data corresponding to the request is monitored.

When a response is received within the predetermined time period, the process proceeds to step 176, indicating a first IR transceiver type. Optionally, the predetermined time period is within a range of one to four clock cycles of the command being transmitted, in accordance with the IrDA serial interface specification. Also optionally, the response to the command may comprise a start bit that occurs no greater than four clock cycles after a last bit of the command.

When a response is not received within the predetermined time period, the process proceeds to step 178, indicating a second IR transceiver type. The second IR transceiver type is preferably of a type that does not include the IrDA serial interface specification. Optionally, the indication of the transceiver type may then be stored in a memory device, such as a non-volatile RAM, a flip flop, a register, or the like. Also optionally, the indication of the first IR transceiver type may be a serial interface device; and the indication of the second IR transceiver type may be a TEMIC style device.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

Any disclosed embodiment may be combined with one or several of the other embodiments shown and/or described. This is also possible for one or more features of the embodiments. The steps herein described and claimed do not need to be executed in the given order. The steps can be carried out, at least to a certain extent, in any other order.

What is claimed is:

1. A method for detecting an infrared (IR) transceiver type comprising:
   entering an IR transceiver detection mode at an IR module of a data processing device; providing a command from the IR module to an IR transceiver, wherein the command is formatted in accordance with a first IR transceiver type; determining whether a response to the command is received within a predetermined time period based on the relationship between a count stored at a counter and the predetermined time period; when the response to the command is received within the predetermined time period, indicating the first IR transceiver type; and when the response to the command is not received within the predetermined time period, indicating a second IR transceiver type.

2. The method of claim 1, wherein the command comprises a request to access one of a plurality of registers of the first IR transceiver type.

3. The method of claim 2, further comprising the step of: monitoring a receive path from the IR transceiver for data corresponding to the request.

4. The method of claim 2, wherein the request comprises one of a read request and a write request.

5. The method of claim 2, wherein the request comprises one of a status check, a function execution, a transceiver ID detection, a capability detection, a serial interface initialization signal, and a bootup initialization sequence.

6. The method of claim 1, wherein the predetermined time period comprises a range of one to four clock cycles.

7. The method of claim 1, wherein the response to the command comprises a start bit that occurs no greater than four clock cycles after a last bit of the command.

8. The method of claim 1, further comprising the step of: storing the indication
   of the IR transceiver type.

9. The method of claim 1, further comprising the step of: indicating the first IR
   transceiver type as a serial interface device.

10. An infrared controller comprising:
    first logic for entering an IR transceiver detection mode; an IR transmitter for providing a command to an IR transceiver;
    an IR receiver for receiving a response to the command from another IR transceiver;
    a counter;
    second logic for: determining whether a response to the command is received within a predetermined time period, the second logic to receive a count from the counter and determine whether the response to the command is received within the predetermined time period based on a relationship between the count and the predetermined time period;
    when the response to the command is received within the predetermined time period, indicating a first IR transceiver type of the another IR transceiver; and
    when the response to the command is not received within the predetermined time period, indicating a second IR transceiver type of the another IR transceiver.

11. The infrared controller of claim 10, further comprising: a register for
    storing the first or second IR transceiver type.

12. The infrared controller of claim 10, further comprising: third logic for
    exiting an IR transceiver detection mode upon storing the IR transceiver type.

13. The infrared controller of claim 10, wherein the register for storing the IR transceiver type comprises one of a non-volatile memory, flip flop logic, and a random access memory.

14. The infrared controller of claim 10, wherein the second logic further functions to determine whether a response to the command is received within a predetermined time period by: receiving a predetermined time period parameter; comparing the count to the predetermined time period parameter: when the count is less than the predetermined time period, determining whether the response to the command has been received.

15. The infrared controller of claim 10, wherein the first IR transceiver type comprises a serial interface device.

16. The infrared controller of claim 10 comprises:
    the infrared controller including circuitry in a first integrated circuit package;
    the IR transceiver including circuitry in a second integrated circuit package;
    wherein the circuitry of the IR transceiver is coupled to the circuitry of the infrared controller.

17. The infrared controller of claim 10, further comprising a store for storing the predetermined time period response for at least one transceiver type.

* * * * *